United States Patent
Arai et al.

[11] Patent Number: 5,361,168
[45] Date of Patent: Nov. 1, 1994

[54] LENS ELEMENT AND LENS BARREL

[75] Inventors: Takashi Arai, Tokyo; Yukihisa Baba, Yokohama; Sachio Umetsu, Kawasaki, all of Japan

[73] Assignee: Canon Kabushiki Kaisha, Tokyo, Japan

[21] Appl. No.: 874,097

[22] Filed: Apr. 27, 1992

[30] Foreign Application Priority Data

| Apr. 30, 1991 | [JP] | Japan | 3-099181 |
| Apr. 30, 1991 | [JP] | Japan | 3-099182 |
| Jun. 24, 1991 | [JP] | Japan | 3-151268 |
| Jun. 24, 1991 | [JP] | Japan | 3-151269 |
| Jun. 24, 1991 | [JP] | Japan | 3-151270 |
| Apr. 20, 1992 | [JP] | Japan | 4-099331 |

[51] Int. Cl.$^5$ .................................. G02B 9/00
[52] U.S. Cl. .................................. 359/796; 359/642
[58] Field of Search .................. 359/796, 642, 718; 156/60, 275.5; 264/1.7

[56] References Cited

U.S. PATENT DOCUMENTS

| 3,423,488 | 1/1969 | Bowser | 264/1 |
| 3,428,533 | 2/1969 | Pichel | 204/7 |
| 3,980,399 | 9/1976 | Howden | 359/796 |
| 4,061,518 | 12/1977 | Burroughs et al. | 156/232 |
| 4,116,753 | 9/1978 | Tojyo et al. | 156/629 |
| 4,155,962 | 5/1979 | Neefe | 264/1 |
| 4,159,292 | 6/1979 | Neefe | 264/1 |
| 4,235,654 | 11/1980 | Dohi et al. | 156/99 |
| 4,623,496 | 11/1986 | Verhoeven et al. | 264/1.7 |
| 4,738,516 | 4/1988 | Verhoeven et al. | 359/796 |
| 5,067,800 | 11/1991 | Shirakawa | 359/642 |

FOREIGN PATENT DOCUMENTS

| 62-272203 | 11/1987 | Japan |
| 62-288030 | 12/1987 | Japan |

*Primary Examiner*—Loha Ben
*Assistant Examiner*—James Phan
*Attorney, Agent, or Firm*—Fitzpatrick, Cella, Harper & Scinto

[57] ABSTRACT

A flow lens element is obtained by integrally molding a resin layer on a glass member. A relief portion for preventing the resin material from adhering to an outer circumferential portion of the glass member is provided between the circumferential portion and an optical portion of the glass member.

1 Claim, 12 Drawing Sheets

LENS ELEMENT AND LENS BARREL

BACKGROUND OF THE INVENTION

This invention relates to a lens element consisting of a glass member on which a resin layer is integrally molded, and to a lens barrel in which such a lens element is incorporated.

In the prior art, a method is known in which a thin film comprising a resin material is molded on the surface of a glass member to form a lens element having an aspherical shape, which is difficult to work when the material is glass. The lens element molded by this method generally is referred to as a replica lens.

As shown in FIG. 1, the method of molding a replica lens includes placing a glass element 50, which has been worked into a spherical shape having a curvature approximating an aspherical shape, upon a mold member 52 having a molding surface 52a of a desired aspherical shape, filling a space 54 between a surface 50a of the glass member 50 and the molding surface 52a of the mold member 52 with a liquified resin and allowing the resin to harden, thereby forming a replica lens 55 having the desired aspherical shape.

The glass member 50 used in this molding method has a rim portion 50b for positioning the completed replica lens 55 relative to a lens barrel. In the prior art, the rim portion 50b is obtained by extending, in the circumferential direction, the surface 50a worked into a spherical shape in order to form the resin layer, or by working the circumferential portion of the glass member 50 into the shape of a flange.

In this example of the prior art, however, the resin material may overflow from the space 54 between the surface 50a of the glass member 50 and the molding surface 52a of the mold member 52, adhere to the rim portion 50b in the manner shown in FIG. 1, and solidify in this state. When the replica lens 55 completed in this fashion is mounted in a lens barrel, the replica lens 55 cannot be positioned accurately due to the protruding hardened resin material, and optical performance deteriorates as a result.

Furthermore, in order for the rim portion to be abutted against a positioning portion of the lens barrel to perform the function of positioning the replica lens with respect to the lens barrel, it is required that the rim portion be worked to a high precision. Consequently, in the case where the outer circumferential portion of the glass member 50 is worked to a flange-shaped configuration to form the rim portion, it is necessary that rim portion be worked to have a high precision. Such working of the glass member 50 requires labor and raises the cost of the replica lens.

In a case where the replica lens is incorporated in a lens barrel, the method adopted in the prior art involves fitting the outer circumferential surface of the replica lens into the inner peripheral surface of the lens barrel in a lightly press-fitted state, whereby the optic axis of the replica lens is aligned with the optic axis of the lens barrel, and subsequently securing the replica lens in the lens barrel by a counter spring. With this method of incorporating the replica lens, however, the inner peripheral surface of the lens barrel is shaved off by the outer circumferential surface of the replica lens when the replica lens is press fitted into the lens barrel. A problem which arises is that shavings produced attach themselves to the optical portions of the replica lens. Since the replica lens ordinarily is an insulator, the shavings are attracted by static electricity produced on the surface of the lens and therefore readily adhere to the lens.

In order to prevent unnecessary light rays reflected at the inner wall of the lens barrel for impinging upon the replica lens and detracting from the overall optical performance of the lens, the conventional practice is to provide the inner wall of the lens barrel with a light shield in such a manner that light reflected at the inner wall of the lens barrel will not impinge upon the lens element. Consequently, if the lens barrel is made of metal, working the light shield requires labor. In a case where the lens barrel is molded of a resin material, the shape of the mold is complicated. This is a hindrance to a reduction in the cost of the lens.

In the case where a resin layer is molded on the surface of the glass member 50 by the above-described method, the resin material contracts as it hardens. More specifically, before hardening occurs, the resin material is introduced so as to fill the space 54 between the molding surface 52a of the mold member and the surface of the glass member 50. After hardening, the resin contracts so that the volume thereof becomes smaller than the volume of the space 54 defined by the molding surface 52a and the surface of the glass member 50.

The following phenomena occur due to this reduction in the volume of the resin material:

(a) The glass member 50 itself flexes under a pulling force from the contracted resin.

(b) The resin material peels off the surface of the glass member 50.

(c) The resin material peels off the molding surface 52a of the mold member 52.

If the glass member 50 itself flexes as set forth in (a) above, the molded aspherical shape will merely undergo a slight shift from the shaped desired. However, if the resin material peels off the glass member 50 as set forth in (b) above, the result is a fatal defect. Further, in the case where the resin material peels off the molding surface 52a, as in (c) above, the entire resin material does not peel off uniformly but only partially. As a consequence, a difference in the ratio of contraction occurs between the portion of the resin material which has peeled off and the portion still clinging to the molding surface 52a. This causes the surface of the resin to be molded into a shape having a curvature which is discontinuous, with the borderline being the portion of the resin material which has peeled off and the portion still clinging to the molding surface.

With regard to the peeling phenomenon between the glass member 50 and the resin material in (b) and between the molding surface 52a and the resin material in (c), the ratio of peeling varies depending upon the type of resin material and the curing conditions. Accordingly, there are cases in which peeling can be prevented by changing these conditions. However, the ratio of peeling is largely dependent upon the shape to which the resin layer is to be molded, and there are instances where peeling cannot be prevented merely by changing the molding conditions.

A method proposed in the prior art as an expedient for preventing (b) and (c) involves enlarging the outer diameter of the glass member 50 to a size greater than necessary and supporting the glass member 50 at a position as close to its outer circumferential edge as possible, thereby intentionally enlarging the deformation

[mentioned in (a) above] of the glass member 50 itself so as to prevent the peeling phenomenon.

However, when the outer diameter of the glass member 50 is enlarged in this manner, the lens barrel in which the glass member is mounted is increased in size and, hence, so is the camera or video camera which uses the lens.

SUMMARY OF THE INVENTION

An object of the present invention is to provide a lens element which, besides having the original optical function, also has a number of other functions, such as preventing the resin material from adhering to the rim portion, preventing shavings from the lens barrel from adhering to the optical portion of the lens element, and preventing unnecessary light from impinging upon the lens element.

Another object of the invention is to provide a lens element in which it is unnecessary to precisely work portions other than the optical portions of the glass member, thereby making it possible to lower cost.

A further object of the invention is to provide a lens element in which peeling between the glass member and the resin layer and between the mold member and the resin layer will not occur when the resin layer is molded, and in which the lens element is not made large in size.

Still another object of the invention is to provide a lens element in which, even if a lens having a protruding portion of resin material is mounted, the lens can be positioned accurately and there is no decline in image quality due to impingement of light rays upon the protruding portion.

According to a first aspect of the present invention, the foregoing objects are attained by providing a lens element in which a resin material is integrally molded on a glass member, wherein a flow relief portion for preventing the resin material from adhering to an outer circumferential portion of the glass member is provided between the circumferential portion and an optical portion of the glass member.

According to a second aspect of the present invention, the foregoing objects are attained by providing a lens element in which a glass material and a resin material are integrated by forming a resin layer on a surface of the glass member, wherein a rim portion is provided on an extension of the resin layer situated outwardly of an optical portion of the resin layer disposed to correspond to an optical portion of the glass member.

According to a third aspect of the present invention, the foregoing objects are attained by providing a lens element in which a resin layer is integrally molded on a surface of a glass member, the resin layer comprising a first functional portion disposed to correspond to an optical portion of the glass member and having a predetermined optical function, and a second functional portion disposed to correspond to a region between an outer circumferential edge of the optical portion of the glass member and a rim portion of the glass member and having a predetermined function.

According to a fourth aspect of the present invention, the foregoing objects are attained by providing a lens element in which a resin layer is integrally molded on a glass member, which has an optical portion and a rim portion, in a state in which at least the optical portion is covered by the resin layer, wherein a comparatively low-rigidity portion is provided between the optical portion and rim portion of the glass member, the low-rigidity portion enabling the optical portion to undergo a relatively small amount of displacement relative to the rim portion along the direction of the optic axis when the resin layer is molded.

The invention further provides a lens barrel for receiving a lens in which a resin is integrally molded on a glass member, the lens barrel comprising a positioning portion for positioning the lens by coming into abutting contact with an outer circumferential portion of the lens, and a light-shielding portion for preventing light rays from impinging upon a protruding portion of the resin possessed by the lens.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiment of the invention, and therefore reference is made to the claims which follow the description for determining the scope of the invention.

DESCRIPTION OF THE PREFERRED EMBODIMENTS

Preferred embodiments of the present invention will now be described in detail with reference to the accompanying drawings,

First Embodiment

Figure 1:
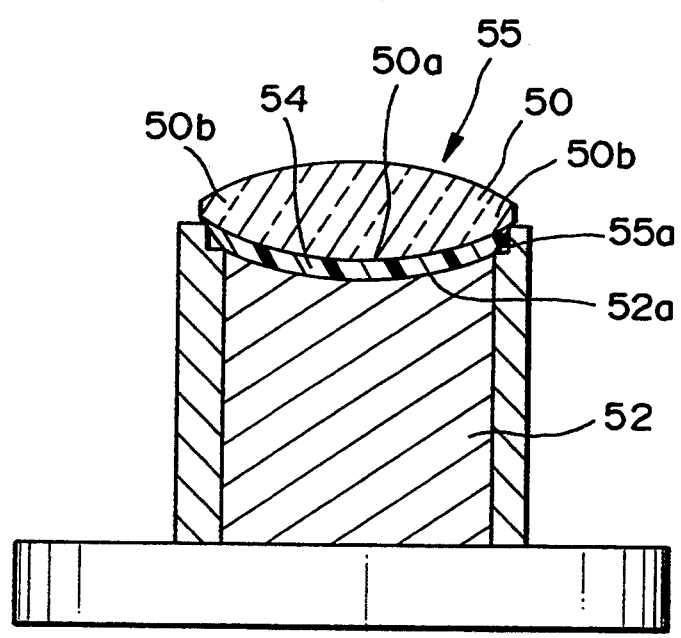
FIG. 1 is a diagram illustrating an example of the prior art.
Figure 2:
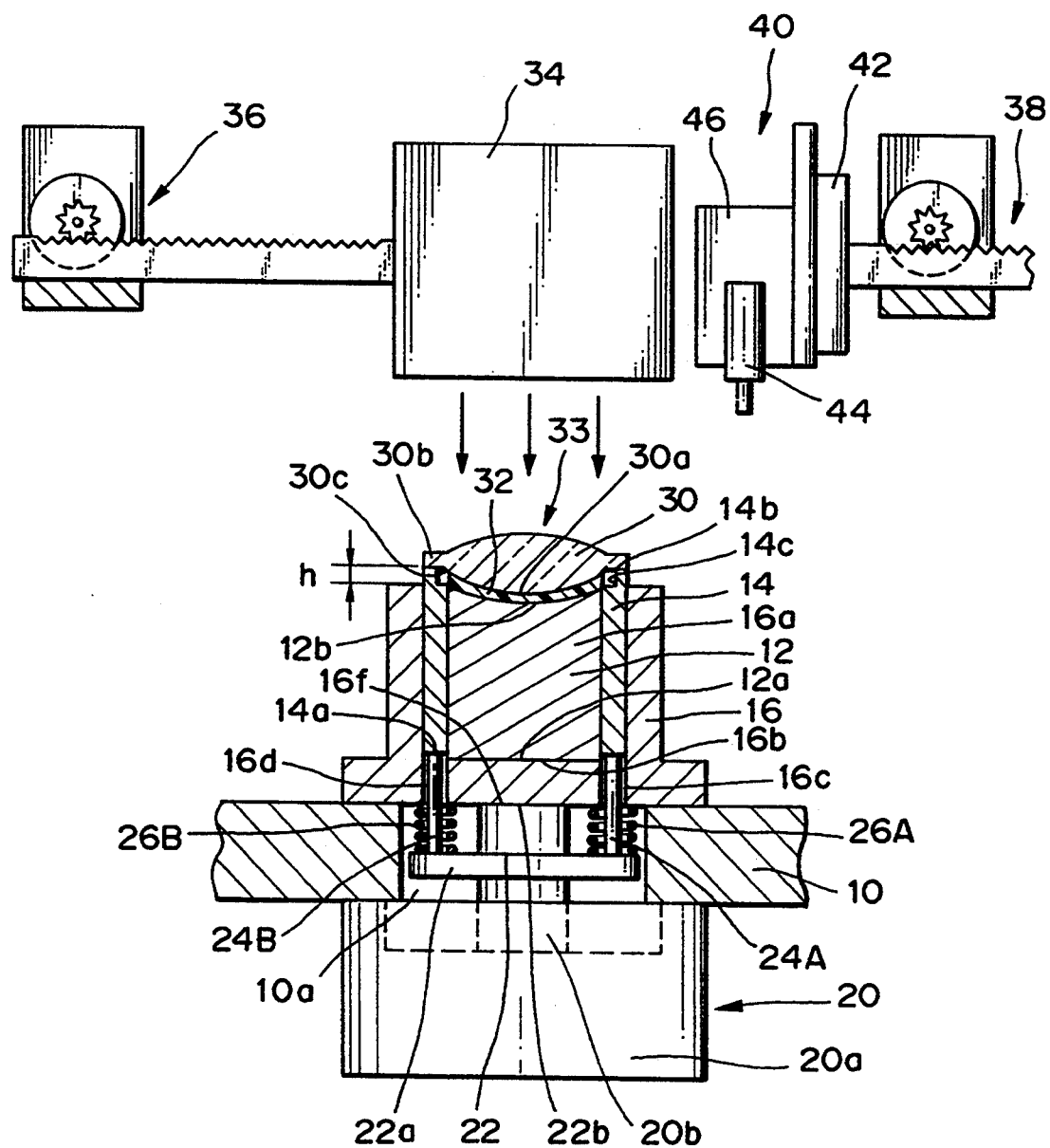
FIG. 2 is a diagram showing the construction of an apparatus for molding a lens element according to an embodiment of the present invention.

FIG. 2 is a diagram showing the general structure of a molding apparatus used when molding a lens element according to a first embodiment of the present invention.

Before the construction of the molding apparatus is discussed, the particulars of a method of molding the lens element of the first embodiment will be described. The method of molding the lens element involves forming a shape, of a kind which is difficult to work in the case of a glass material, on the surface of a glass material, and forming a resin layer having a surface of a prescribed complicated shape and consisting of a resin material on the surface of a glass member worked into a shape that is comparatively easy to work. An example is fabrication of an aspherical lens in which a film of resin having an aspherical shape is molded on the surface of a glass men%her worked into a spherical shape to combine the glass material and the resin material. In other words, in order to provide a lens in which aberration is corrected by a single lens, it is necessary that the surface shape of the lens be made aspherical. However, it is not easy to work a glass material into an aspherical shape, and it is difficult to realize lens power with a lens which uses a resin that is readily molded into an aspherical shape. Accordingly, it has been attempted to exploit the advantages of both types of lenses by combining them. A lens thus manufactured in referred to as a replica lens.

More specifically, as shown in FIG. 2, a resin layer 32 comprising a thin resin film of a type cured by an activating energy beam is formed on one surface, namely a contact surface 30a, of a glass member 30 whose surface has been worked to a spherical shape. The glass member 30 has a flange-shaped rim portion 30b on its outer circumference and is retained on a support member 14 with the rim portion 30b in abutting contact with an upper end face 14b of the support member 14. The upper end face 14b of the support member 14 protrudes by a height h from the edge portion of a molding surface 12b of a mold member 12 that is for molding the surface shape of the resin material. By virtue of the amount of protrusion h, a prescribed thickness is provided even at the portion where the the resin layer 32 is least thick. (Since the molding surface 12b is aspherical in shape, the thickness of the resin layer differs depending upon the location.) The space defined by the molding surface 12b of the mold member 12 and the contact surface 30a is filled with a liquified resin material. By irradiating this resin material with an activating energy beam, the resin material is cured to complete a replica lens 33.

The construction of the apparatus for molding and working the replica lens will now be described in accordance with FIG. 2. Numeral 10 denotes a base plate which holds the mold member 12 for molding the resin layer 32, as well as the support member 14 for supporting glass member 30. The base plate 10 is provided so as to extend horizontally. The mold member 12, the support member 14 and a molding frame 16 are supported on the top side of the base plate 10. An air cylinder 20 for moving the support member 14 relative to the mold member 12 is disposed beneath the base plate 10.

More specifically, the frame 16, the central portion of which has a columnar cavity 16a opening vertically upward, is fixed to the top side of the base plate 10. A cylindrically shaped support member having an outer diameter slightly less than the inner diameter of the columnar cavity 16a is inserted into the cavity 16a. That is, the support member 14 is inserted into the frame 16 so as to be capable of sliding axially (up and down in FIG. 2) with its outer peripheral surface fitted into the inner peripheral surface of the cavity 16a. Since the lower end face 14a of the support member 14 comes into abutting contact with the bottom 16b of the cavity 16a, the support member 14 is prevented from moving downward beyond bottom 16b.

The columnar mold member 12, whose outer diameter is slightly smaller than the inner diameter of the support member 14, is inserted into the support member 14. The support member 14 and the mold member 12 are capable of sliding relative to each other in a state in which they are fitted together so that the outer peripheral surface of the mold member 12 and the inner circumferential surface of the support member 14 are slidable. The mold member 12 has a bottom surface 12a fixed to the bottom 16b of the cavity 16. As a result, the support member 14 is capable of sliding up and down with its inner and outer peripheral surfaces are guided by the outer peripheral surface of the mold member 12 and the inner peripheral surface of the frame 16, respectively.

The air cylinder 20, which is for moving the support member 14 up and down relative to the mold member 12 and frame 16, is secured to the bottom side of the base plate 10. The upper end of the air cylinder 20 has a cylinder rod 20b which moves relative to an air cylinder body 20a. A columnar connecting member 22 for being connected to the support member 14 is attached to the top side of the cylinder rod 20b. The cylinder rod 20b and the connecting member 22 are interconnected with mechanical members, which is disposed on the upper side of the base plate 10, via a through-hole 10a formed in the base plate 10.

The circumferential portion of the connecting member 22 is formed to have a flange 22a. Connecting rods 24A, 24B and 24C (only 24C is not shown) are secured in an upright state to the top side of the flange 22 at three locations on the circumference thereof. The upper ends of the connecting rods 24A, 24B and 24C, which are passed through through-holes 16c, 16d and 16e (only 16e is not shown) formed at three locations in the bottom of the frame 16, penetrate into the columnar cavity 16a and are connected to the end face 14a on the lower side of the support member 14. Accordingly, when the air cylinder 20 is actuated to move the connecting member 22 upward, the support member 14 is urged upward via the connecting rods 24A, 24B and 24C.

FIG. 2 illustrates the support member 14 urged to its uppermost position. In this state, the upper end face 14b of the support member 14 protrudes by the amount h beyond the edge of the resin-material molding surface 12b, which is the upper surface of the mold member 12. The molding surface 12b of the mold member 12 has been worked to an aspherical shape required for the completed shape of the replica lens 33. Therefore, by curing a resin material, which fills the space defined by the contact surface 30a of the glass member 30 and the molding surface 12b in a state in which the glass member 30 has been placed upon the top side 14b of the support member 14, the resin layer 32 to which the aspherical shape of the molding surface 12b has been transferred can be formed on the surface of the glass member 30.

It will be understood from observing FIG. 2 that the amount of protrusion h of the support member 14 decides the thickness of the resin layer 32 formed on the glass member 30. In order to accurately decide the amount of protrusion h, the upper surface of the connecting member 22 is formed to have an abutting face 22b. By bringing the abutting face 22b into contact with a bottom side 16f of the frame 16, the amount of protrusion h of the support member 14 is determined. Though the value of h differs depending upon the ratio to which the molding surface 12b is aspherical, h is set to such a value that the thickness of the resin layer 32 will not fall below, say, 30 μm, at the location where the resin layer 32 is thinnest.

The upper end of the support member 14 is formed to have a relief 14c for accommodating a bulging portion of the resin material caused by overflow. This prevents overflowing resin material from attaching itself to the support member 14. It also prevents burrs from being formed by overflow of the resin material from the portion where the glass member 30 and the upper end face 14b of the support member 14 contact each other.

Compression springs 26A, 26B, 26C (only 26C is not shown) are disposed in a loosely fitted state on the connecting rods 24A, 24B, 24C, respectively, between the bottom side 16f of the frame 16 and the top side of the flange 22a of connecting member 22. As a result, the connecting member 22 is urged downwardly away from the bottom side 16f of the frame 16. Accordingly, when the air cylinder 20 is deactuated, the cylinder rod 20b and the connecting member 22 are urged downwardly under their own weight and by the biasing force of the compression springs 26A, 26B, 26C, and the support member 14 moves downward relative to the mold member 12 and frame 16. Consequently, the upper end face 14b of the support member 14 is lowered until it becomes flush with the molding surface 12b of the mold member 12; hence, the glass member 30 is no longer supported by the support member 14.

An irradiating apparatus 34 for emitting activating energy beams is arranged above the glass member 30. The resin layer 32 can be cured by irradiating it with the activating energy beams from the irradiating apparatus 34. The latter is supported on a transport mechanism 36 and is so adapted that it can be withdrawn from the optical axis of the glass member 30 when necessary.

In addition to the irradiating apparatus 34, an apparatus 40 for supplying the resin material is arranged above the glass member 30. The supply apparatus 40 is supported on a transport mechanism 38 capable of being moved between a position on the optic axis of the glass member 30 and a position remote therefrom. The supply apparatus 40 is equipped with an elevating mechanism 42 held by the transport mechanism 38, a syringe 44 supported on the elevating mechanism 42, and a drive unit 46 for driving a piston possessed by the syringe 44. The supply apparatus 40 is so adapted as to supply the molding surface 12b of the mold member 12 with a predetermined amount of resin material.

A procedure for molding and working the replica lens in the molding apparatus set forth above will now be described.

In connection with the molding of the replica lens 33, it is necessary first to supply the molding surface 12b of the mold member 12 with the resin material. FIG. 3 illustrates the procedure of the operation for supplying the resin material.

Figure 3A:
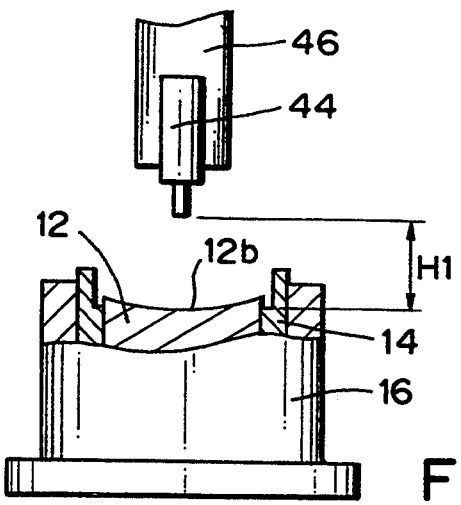
FIG. 3(a)–3(e) is a diagram showing the procedure of an operation for supplying a resin material.
Figures 3B, 3C:
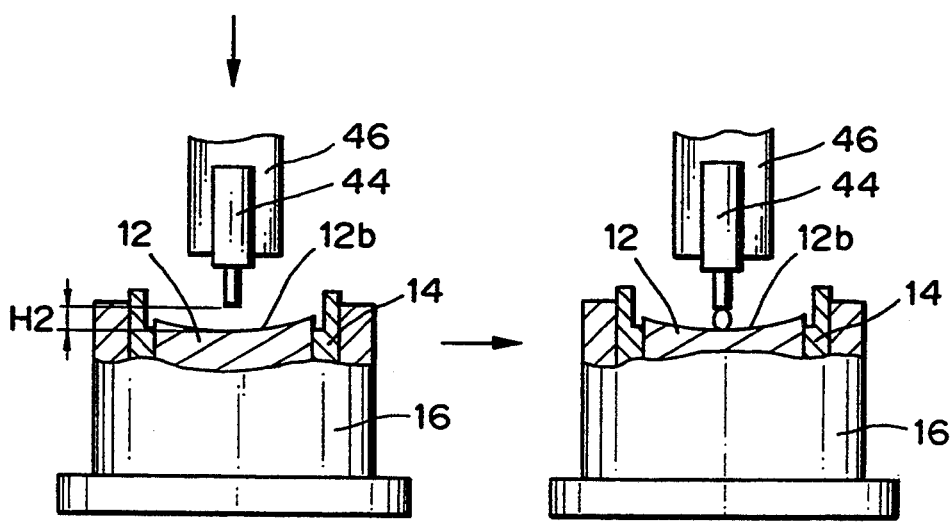
Figures 3D, 3E:
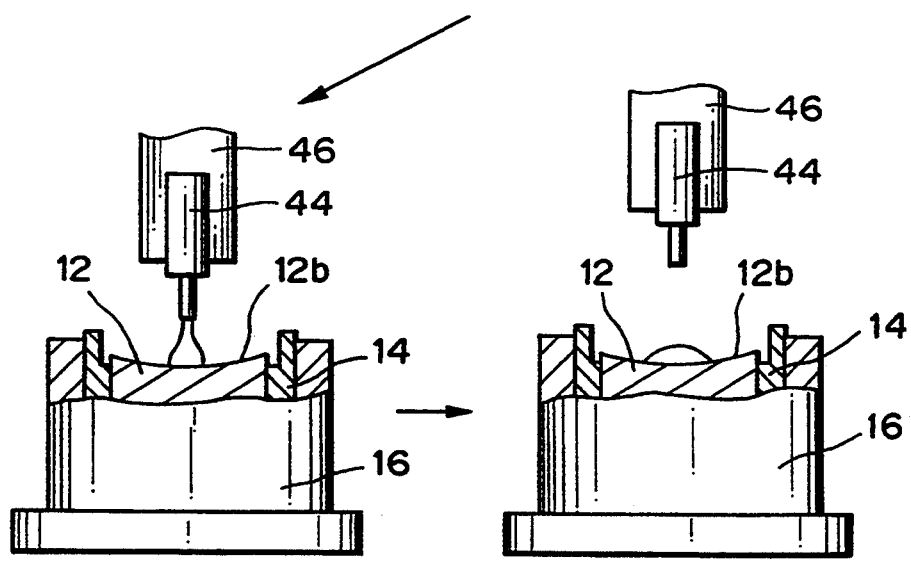

First, the transport mechanism 38 is actuated to position the supply apparatus 40 relative to the mold member 12 in such a manner that the tip of the syringe 44 is brought to the center of the molding surface 12b, as illustrated in FIG. 3(a). Next, the elevating mechanism 42 is actuated and lowered in such a manner that the syringe 44 is made to approach the molding surface 12b, as shown in FIG. 3(b). The elevating mechanism 42 is halted just before the tip of the syringe 44 contacts the molding surface 12b. Under these conditions, a resin material is discharged in small increments from the tip of the syringe 44, as depicted in FIG. 3(c). At the same time as discharge begins, or upon passage of a prescribed period of time from the start of discharge, the syringe 44 is slowly raised, as shown in FIG. 3(d). The operation for discharging the resin material continues even as the syringe 44 is being raised and is terminated when the amount of resin material supplied reaches a prescribed value. The rate at which the resin material is discharged and the speed at which the syringe 44 is raised are set in such a manner that there will be no interruption in the resin material between the molding surface 12b and the tip of the syringe 44 when the syringe 44 is being raised. When the syringe 44 has reached a predetermined height, the operation of the elevating mechanism 42 is terminated.

A specific example of the operation for supplying the resin material will be described. It will be assumed that the resin material used is of the type cured by ultraviolet radiation, namely a monomer of urethanated acrylate and acrylate, and that an aspherically shaped resin layer having a center thickness of 30 μm and a maximum thickness of 60 μm is molded on the surface of a glass lens having a diameter of 18 mm. In this case the volume of the resin material supplied will be $14 \times 10^{-3}$ cc.

First, in FIG. 3(a), the height, indicated by H1, of the tip of syringe 44 above the molding surface 12b is 100 mm. From this position, the syringe 44 is lowered at a speed V1=100 mm/s and is stopped when its tip reaches a position having a height H2=1.1 mm from the molding surface 12b, as illustrated in FIG. 3(b)).

Next, in the state shown in FIG. 3(b), the resin material starts being discharged from the syringe 44 at a rate of $3.5 \times 10^{-3}$ cc/s. When $3.5 \times 10^{-3}$ cc of the resin material has been discharged and the resin material contacts the molding surface 12b, as depicted in FIG. 3(c), the syringe 44 starts to be raised at a low speed, i.e., 0.2 mm/s. As the syringe 44 is thus being raised, the resin material continues to be discharged, as illustrated in FIG. 3(d). Then, four seconds after the start of resin discharge, the discharging operation is terminated. A suitable amount of the resin material, namely $14 \times 10^{-3}$ cc, is thus discharged. At this time the tip of the syringe 44 is at a height of 1.7 mm from the molding surface 12b, but the syringe 44 continues to be raised without interruption. When the tip of the syringe 44 reaches a position at a height of 6 mm from the molding surface 12b, the elevation operation is halted. Thereafter, as depicted in FIG. 3(e), the syringe 44 is raised at a high speed to return it to the same position as that shown in FIG. 3(a). Here the process for supplying the resin material is ended.

By supplying the resin material in accordance with the foregoing process, the following two effects are obtained:

(1) The resin material is not dropped onto the molding surface 12b from a position high above it. Rather, the resin material is allowed to contact the molding surface gently while in a generally spherical shape resulting from its surface tension. This makes it possible to prevent air bubbles from forming in the resin material owing to shock sustained by being dropped upon the molding surface.

(2) In a case where the resin material is discharged at a position close to the molding surface 12b, the surface tension of the resin material causes a ball of the resin material to form so as to envelope the tip of the syringe 44. As a consequence, the resin material attaches itself to the tip of the syringe 44 so that an accurate amount of the resin material cannot be supplied. By contrast, when the tip of the syringe 44 is raised as the resin material is being discharged, as in the above-described embodiment, the resin material no longer is capable of attaching itself to the syringe tip. This makes it possible to accurately regulate the amount of resin material supplied.

In connection with (1) above, the entrapment of air bubbles in the resin material is conceivable also in the process of placing the glass member 30 on the support member 14 after the resin material has been supplied. Accordingly, it is very important that these processes be managed so as to prevent the entrapment of air bubbles. Even if air bubbles are entrapped to a ratio that will not affect the optical function of the lens, entrapped air bubbles that can be confirmed visually and render the manufactured product unsuitable for shipping. Thus, managing this problem is an important factor in raising yield.

(2) In connection with (2) above, the amount of resin material which fills the space between the contact surface 30a of the glass member 30 and the molding surface 12b is very small and therefore it is important that the amount of resin material be precisely regulated so that a fixed quantity is supplied. By adopting the method set forth above, the volume of the resin material supplied can be accurately controlled so as to be constant.

In a case where, by way of example, an arrangement is adopted for controlling the weight of the resin material at the time of supply, the volume of the resin material varies widely depending upon temperature and humidity, even if the weight of the resin material is constant. This makes it necessary to strictly manage temperature and humidity in order that the resin material will be delivered even to the corners of the space between the contact surface 30a and the molding surface 12b and without protruding from the space by a large amount. To this end, it is preferred that the amount of resin material supplied be controlled based upon volume.

When supply of the resin material ends, the moving mechanism is actuated to retract the supply apparatus 40 from the optical axis of the glass member 30. As shown in FIG. 2, the air cylinder 20 is actuated to elevate the support member 14 to place the upper end face 14b of the support member 14 in a state where it protrudes from the edge of the molding surface 12b of the mold member 12 by the amount h. When this state has been attained, the glass member 30, whose contact surface 30a has been coated with a coupling agent so that the resin layer 32 will not readily peel off, is placed upon the support member 14 in such a manner that its rim portion 30b abuts against the upper end face 14b of the support member. The glass member 30 is placed upon the support member 14 very carefully so that the resin material will be delivered, without air bubbles being formed, into the space, including the corners thereof, defined by the contact surface 30a of the glass member 30 and the molding surface 12b of the mold member 12.

In actuality, it is not possible to control the amount of resin material so that it will fill the aforementioned space up to its corners with absolutely no protrusion of the resin material from the space. This means that a small amount of the resin material will protrude from the edge of the molding surface 12b. If the protruding resin material attaches itself to the rim portion 30b of the glass member 30, the completed replica lens 33 when incorporated in the lens barrel will be mounted in a tilted attitude relative to the optic axis of the lens barrel and the optical performance will decline as a result. Accordingly, the glass member 30 is provided with a flow relief portion 30c for the resin material at a position between the rim portion 30b and the part of the glass member outwardly of an effective diameter D of light rays (see FIG. 6). The flow relief portion 30c is formed by cutting into the glass member 30 to a depth below an extension of the contact surface 30a thereof so as to form a steep, upwardly directed inclined surface. Since the protruding resin material attempts to migrate downward in accordance with the force of gravity, the fact that the relief portion 30c is defined by the upwardly directed, steeply inclined surface prevents the resin material from flowing to the rim portion 30b.

Further, a relief portion 14c is formed on the upper end of the support member 14 so that the protruding the resin material is prevented from attaching itself to the support member 14.

When the operation for placing the glass member 30 upon the support member 14 ends, the transport mechanism 36 is actuated to transport the irradiating apparatus 34 to the optic axis of the glass member 30. The resin material 32 is irradiated, through the glass member 30, with ultraviolet radiation serving as the aforementioned activating energy. As a result of irradiation, the resin layer 32 begins to harden.

Figure 4:
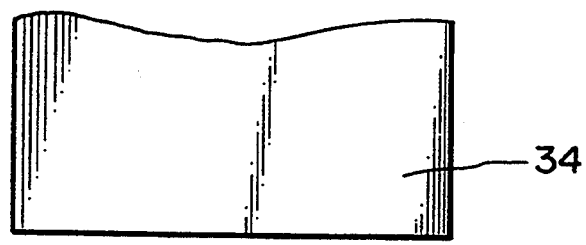
FIG. 4 is a diagram showing the molding apparatus of FIG. 2 in a state where a support member has been released.
Figure 4:
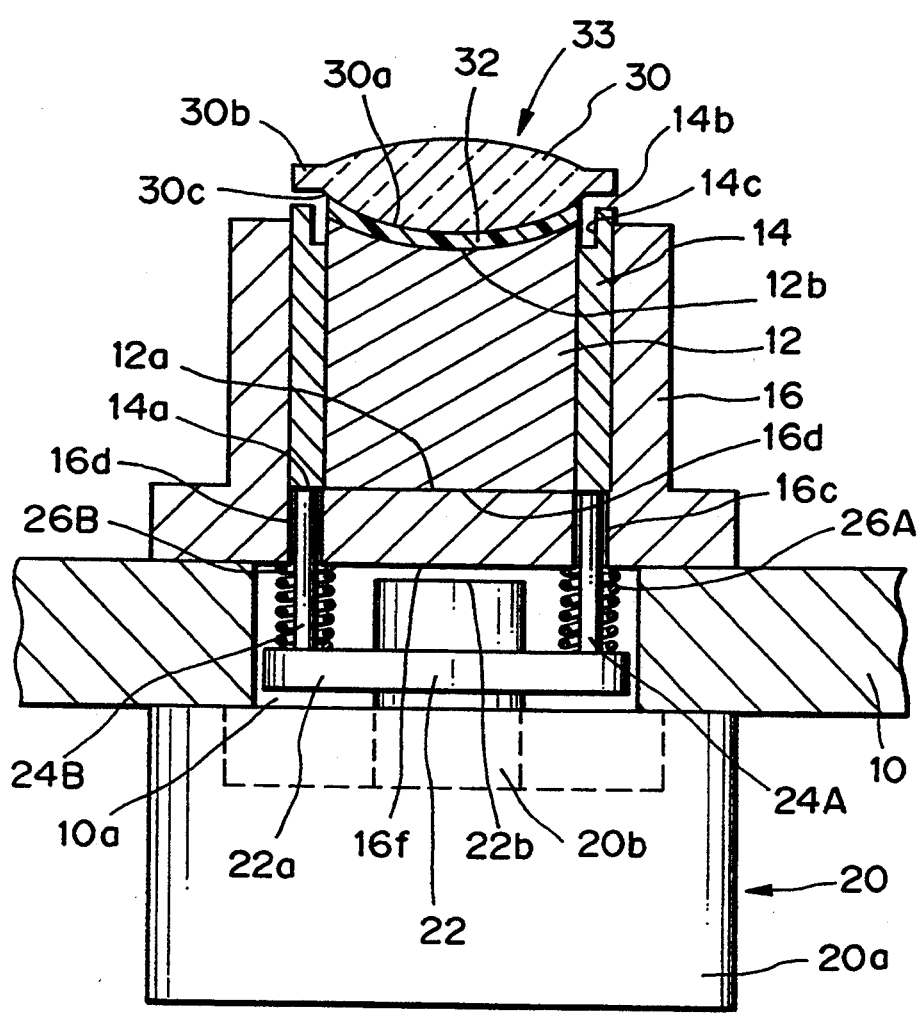

In addition to resins of the type which cure by ultraviolet radiation, even resins of the bonding-agent type generally undergo a contraction in volume at curing. Consequently, in a case where the glass member 30 is held by the support member 14 until the resin layer 32 cures completely, peeling develops between the resin layer 32 and the contact surface 30a of the glass member 30 as well as between the resin layer 32 and the molding surface 12b due to contraction of the resin layer 32. In order to solve this problem in accordance with the first embodiment of the invention, the resin layer 32 is allowed to cure to a hardness capable of retaining the glass member 30. Once this state has been attained, the glass member is release from support by the support member 13, as illustrated in FIG. 4. If such an expedient is adopted, the glass member 30 will be capable of moving with the contraction of the resin film 32, thereby making it possible to prevent the peeling phenomenon.

Figure 5:
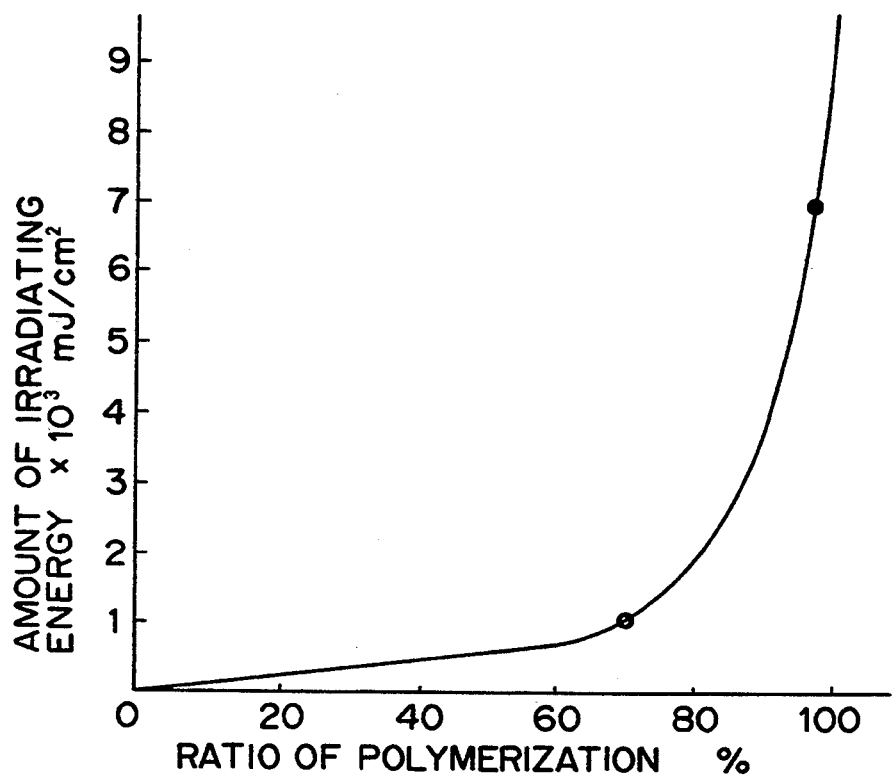
FIG. 5 is a diagram illustrating the relationship between an amount of irradiation energy and ratio of polymerization.

This will be described with regard to a specific example. In a case where the above-mentioned resin material of the type cured by ultraviolet radiation, namely the monomer of urethanated acylate and acrylate, is used as the resin material, the resin layer 32 is irradiated with ultraviolet radiation, which has a center wavelength of 365 nm, for 30 seconds at an irradiation intensity of 30 mW/cm$^2$. The resin layer irradiated using a fluorescent lamp within the irradiating apparatus 34. The amount of irradiating energy per square centimeter by a first stage of irradiation is 30 mW×30 sec=900 mWs=900 mJ. The ratio of polymerization of the resin material is approximately 70%, as indicated by the white circle on the graph of FIG. 5, which illustrates the relationship between irradiating energy and ratio of polymerization. When the ratio of polymerization of approximately 70% has been achieved, the resin layer will have attained a hardness at which the layer will not shift relative to the glass member 30 or molding surface 12b even if the glass member 30 is released from support by the support member 14. Even under these conditions, however, it is possible for the glass member 30 to be moved with respect to the mold member 12 if an external force is applied.

When the first stage of irradiation ends, the air cylinder 20 is deactuated and the glass member 30 is released from support by the support member 14, as depicted in FIG. 4. Thereafter, the resin layer 32 is again irradiated with ultraviolet radiation having the same center wavelength of 365 nm but for a period of 60 second at an irradiation intensity of 100 mW/cm$^2$. This irradiating operation is performed by a high-voltage mercury-xenon lamp, which is one other light source within the irradiating apparatus 34. The amount of irradiating energy per square centimeter by this second stage of irradiation is 100 mW×60sec=6000 mJ. The total amount (first and second stages) of irradiating energy is 6900 mJ. The ratio of polymerization corresponding to this amount of irradiating energy is is on the order of 96%, as indicated by the black circle on the graph of FIG. 5. This represents substantially complete hardening of the resin material.

In the foregoing example, the irradiation intensity and irradiation time are set in such a manner that the ratio of polymerization of the resin material will be 70% as a result of the first stage of irradiation. However, the set value of polymerization is not limited to 70%. In actual practice, similar effect can be obtained if the ratio of polymerization is set to fall within the range of 50~90%.

Figure 6:
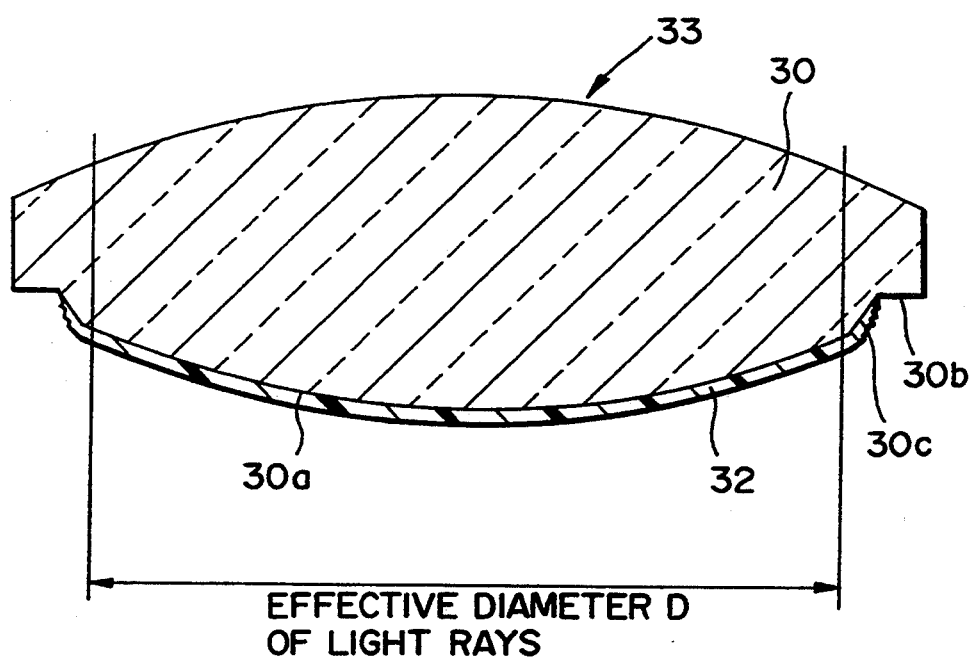
FIG. 6 is a diagram showing the shape of a completed replica lens having a convex surface.

The replica lens 33 whose resin layer 32 has thus been fully cured is released from the mold member 12 and a prescribed coating (e.g., a coating which prevents reflection) is applied to its upper and lower surfaces, thereby completing the replica lens 33. FIG. 6 shows the replica lens 33 in its completed form.

Next, another example of the first embodiment will be described below.

The resin material employed here is a liquified compound of urethanated polyesteracrylate of 38 wt %, di-trimethylolpropane-tetraacrylate of 35 wt %, isobornylacrylate of 25 wt % and 1-hydroxycyclohexylphenylketone of 2 wt %, which has a faster curing speed than that used in the first example in this embodiment. The molding apparatus and the mold member are the same as those shown in FIG. 2.

First, the resin layer 32 is irradiated with ultraviolet radiation having the center wavelength of 365 nm for a period of 10 second at an irradiation intensity of 2 mW/cm$^2$. The irradiating operation is performed by the fluorescent lamp in the irradiating apparatus 34. The amount of irradiating energy per square centimeter by this first stage of irradiation is 2 mW×10 sec=20 mWs=20 mJ. The ratio of polymerization of the resin material is about 90%, the resin layer will have been hardened to a certain ratio by the end of this first stage of irradiation, however, it is possible for the glass member 30 to be moved with respect to the mold member 12 if an external force is applied.

When this first stage of irradiation ends, the air cylinder 20 is deactuated and the glass member 30 is released from support by the support member 14, as shown in FIG. 4. Thereafter, the resin layer 32 is again irradiated with ultraviolet radiation having the same center wavelength of 365 nm for 20 second at an irradiation intensity of 100 mW/cm$^2$. This irradiating operation is performed by the high-voltage mercury-xenon lamp, one other light source within the irradiating apparatus 34. The amount of irradiating energy per square centimeter by this second stage of irradiation is 100 mW×20 sec=2000 mJ. The total amount (first and second stages) of irradiating energy is 2020 mJ. The ratio of polymerization corresponding to this amount of irradiating energy is about 96%, representing a substantially complete hardening of the resin layer.

According to this example, the irradiation time in the first irradiation stage is 10 sec and that in the second irradiation stage is 20 sec. The total irradiation time 30 sec is short enough to minimize molding time, thus improving productivity.

Further, the resin material after the first irradiation has a comparatively high viscosity of 50000 cps. This prevents irregular protruding of the resin material in moving of the glass member 30 which adheres to the rim portion 30b.

Figure 7:
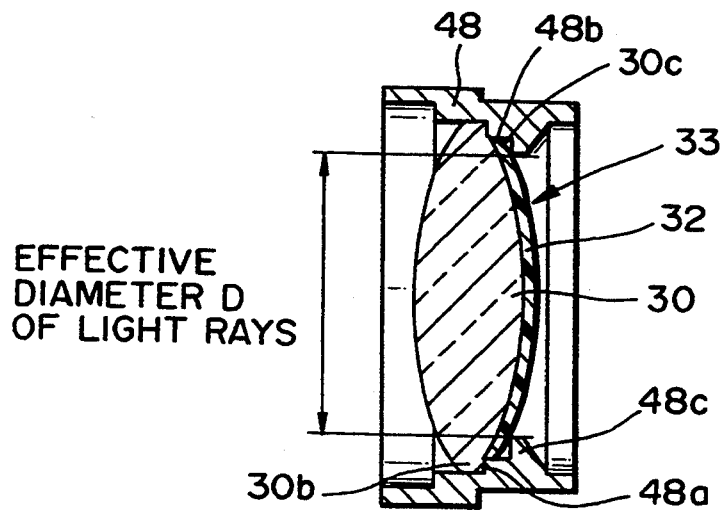
FIG. 7 is a diagram showing an example of a lens barrel in which the replica lens of FIG. 6 has been mounted.

FIG. 7 illustrates a example of a lens barrel in which the replica lens 33 is mounted.

As shown in FIG. 7, a lens barrel 48 is provided with a positioning portion 48a for setting the position of the center of the replica lens 33 as well as its position along the optic axis by abutting against the rim portion 30b of the lens. The lens barrel 48 is further provided with a relief portion 48b for accommodating the resin material protruding from the resin flow relief portion 30c of the replica lens 33. The lens barrel 48 also includes a light-shielding portion 48c on the light-incident side, namely in front of the replica lens 33. The light-shielding portion 48c has an inner diameter slightly larger than the effective diameter of an entrant light rays and therefore prevents the light rays from impinging upon the portion of the resin protruding from the relief portion 30c.

By thus providing the lens barrel 48 with the relief portion 48b for receiving the bulging portion of the resin material and with the light-shielding portion 48c on the light-entrant side, the replica lens 33 can be positioned accurately with respect to the lens barrel 48. Moreover, it is possible to prevent undesirable phenomena such as diffuse reflection and irregular refraction of light rays caused by the light rays impinging upon the bulging portion of the resin material, which has an irregular surface shape. As a result, a deterioration in image quality can be prevented.

In the foregoing embodiment, a case is described in which a replica lens having a convex surface is molded. However, it is possible to mold a replica lens having a concave surface in exactly the same manner.

Figure 8:
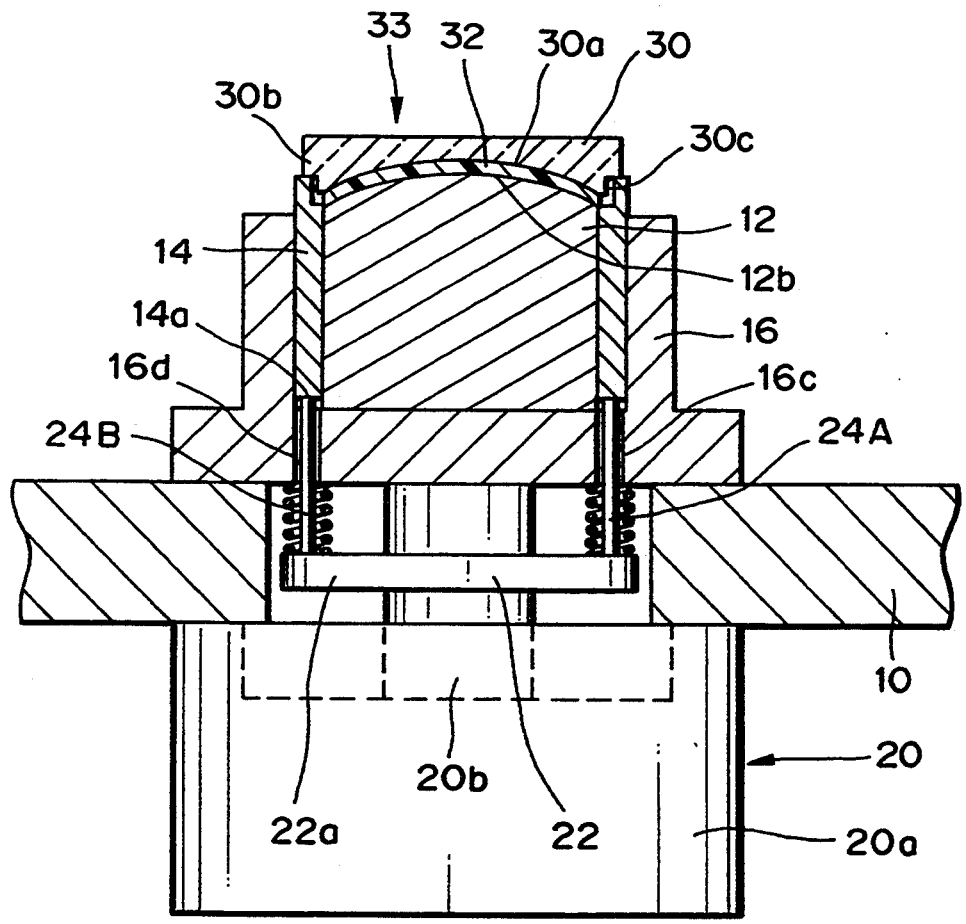
FIG. 8 is a diagram showing the construction of an apparatus for molding a replica lens having a concave lens.

FIG. 8 illustrates a molding apparatus for a case where the replica lens 33 having a concave surface is molded. This apparatus can be realized merely by substituting a mold member corresponding to the concave surface for the mold member 12 in the molding apparatus of FIG. 2. Other structural components and the molding operation are exactly the same as in the molding apparatus shown in FIG. 2.

Figure 9:
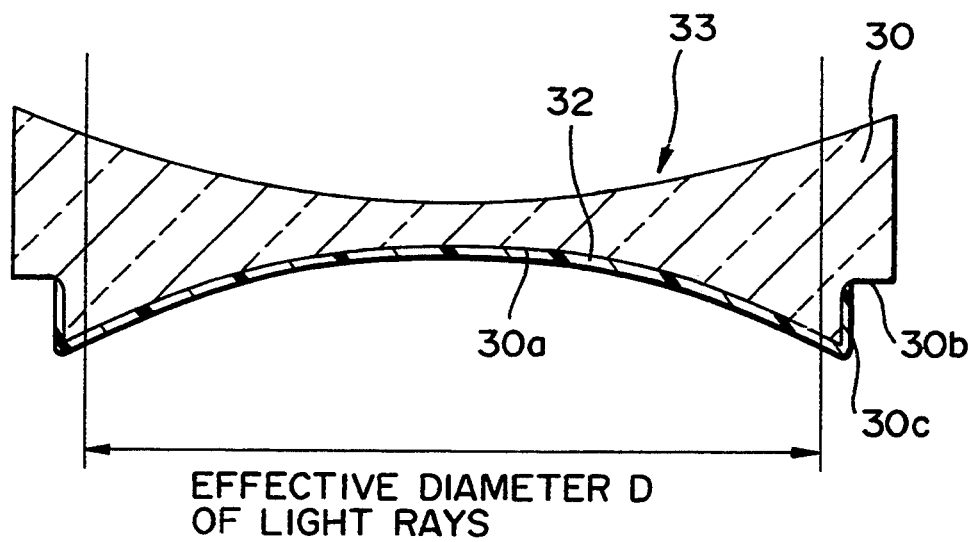
FIG. 9 is a diagram showing the shape of a completed replica lens having a concave surface.

FIG. 9 illustrates the completed shape of the replica lens 33 having a concave surface. As in the replica lens having the convex surface, this lens also has the rim portion 30b and the flow relief portion 30c for the resin material.

Figure 10:
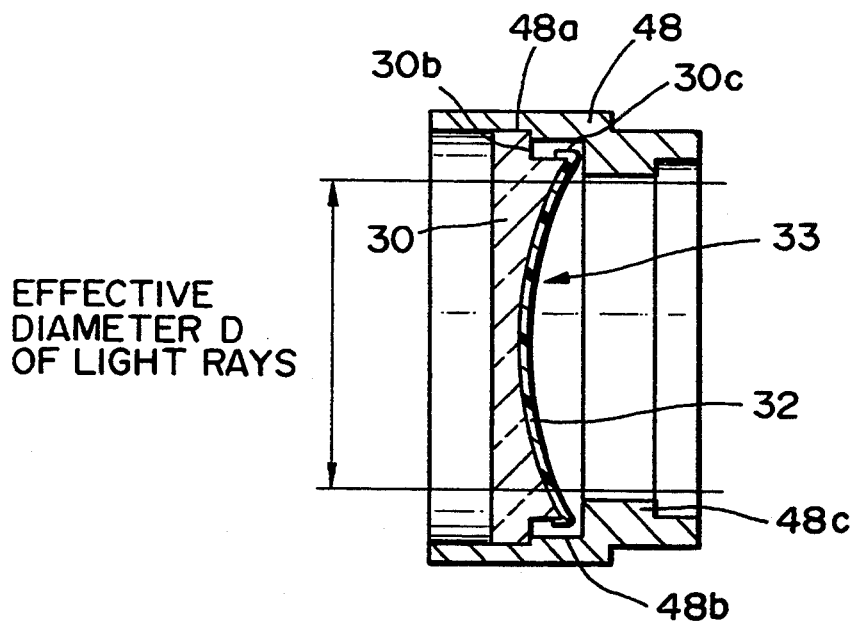
FIG. 10 is a diagram showing an example of a lens barrel in which the replica lens of FIG. 9 has been mounted.

FIG. 10 is a diagram depicting a lens barrel in which the replica lens 33 having the concave surface is mounted. The lens barrel has the positioning portion 48a for positioning the replica lens 33, the relief portion 48b for accommodating the protruding resin material, and the light-shielding portion 48c for preventing light from impinging upon the protruding portion of the resin material. This is exactly the same as in the lens barrel 48 shown in FIG. 7.

As for such conditions as the discharge rate of the resin material and the speed at which the syringe is moved when the resin material is supplied to the mold member, as well as such conditions as the irradiation intensity and irradiation time when the resin material is irradiated with the ultraviolet radiation, one ideal example is pointed out in the embodiment described above. However, the invention is not limited to the conditions illustrated in the above-described embodiment.

It has been set forth above that the glass member is placed upon the support member after the resin material is supplied to the mold member. However, if the mold member is provided with a hole for supplying the resin material, the resin material can be supplied to the space between the glass member and the mold member after the glass member is placed upon the support member.

Further, an arrangement may be adopted in which the resin is supplied to the glass member and not the frame member, after which the glass member so supplied with the resin is placed upon the support member.

In the case described above, a planar rim portion is formed on the outer circumferential portion of the glass member. However, even if use is made of a glass member having a form obtained by extending the spherical portion for forming the resin layer, it is possible to apply a rim portion in the same manner.

Furthermore, though the case described above relates to formation of a replica lens, the present invention can be applied in a similar manner to other types of optical elements so long as a resin film is formed on the surface of a glass material.

In the case described above, an air cylinder and springs are employed in order to raise and lower the support member. However, it goes without saying that these can readily be replaced by an elevating mechanism which is a combination of a ball screw and a stepping motor or DC servomotor, etc.

Though it is described that the mold member is held fixed and the support member is moved up and down relative to the mold member, it is permissible to adopt an arrangement in which the support member is fixed and the mold member is moved up and down.

In accordance with the lens element of the first embodiment, as described above, the flow relief portion for the resin material makes it possible to prevent the resin material from flowing around to the rim portion of the glass member. As a result, the resin material will not attach itself to the rim portion.

Second Embodiment

A lens element according to a second embodiment of the invention will now be described. In the lens element according to the first embodiment, a flow relief portion for the resin material is formed between the optical portion and the rim portion. In the second embodiment described below, a functional portion having a function with differs from that of the first embodiment is provided between the optical portion and the rim portion. The apparatus and method for molding lens element of the second embodiment are almost the same as those used in the first embodiment.

Figure 11:
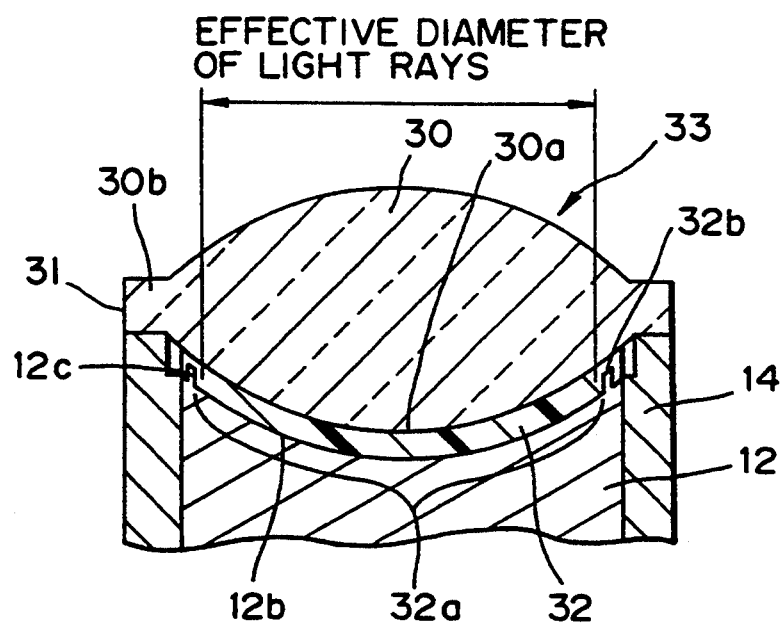
FIG. 11 is a partially enlarged view showing a molding member and a lens element in a second embodiment of the invention.

FIG. 11 is a partially enlarged view showing the shape of the molding surface of the mold member and the shape of the resin layer.

In FIG. 11, the part of the molding surface 12b that corresponds to the optical portion of the glass member 30 (namely the portion of the glass member inwardly of the effective diameter of entrant light rays) is worked to an aspherical shape for transferring a predetermined aspherical shape to the surface of the resin layer 32 in the manner described earlier. Further, the part of the molding surface 12b that corresponds to the outer peripheral portion of the optical portion of the glass member 30 is formed to have an annular projection 12c. Accordingly, the part of the resin layer 32 of the completed lens element 33 that corresponds to optical portion of the glass member 30 is formed to have an aspherical portion 32a (a first functional portion) having the original function of the resin layer 32, namely a function for correcting aberration. Further, the outer periphery of the aspherical portion 32a is formed to have an annular groove 32b (a second functional portion) having a function different from the aberration-correcting function.

Figure 12:
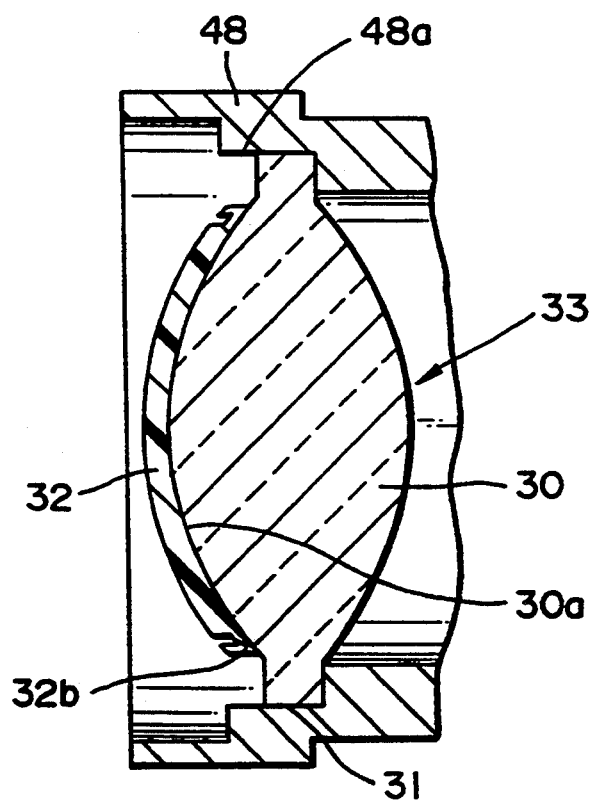
FIG. 12 is a diagram showing the lens element of FIG. 11 in a state mounted in the lens barrel.

As shown in FIG. 12, the completed lens element 33 is mounted in the lens barrel 48 in a state in which the outer circumferential surface 31 of the lens element is lightly press-fitted into the inner circumferential surface of the lens barrel 48. As a result, when the lens element 33 is press-fitted into the lens barrel 48, the outer circumferential surface 30c of the lens element 33 scrapes the inner peripheral surface 48a of the lens barrel 48 and shavings are produced from the lens barrel 48. Since the glass member 30 forming the lens element 33 and the resin layer 32 generally are insulators, they readily produce static electricity. As a consequence, a problem arises in which the shavings from the lens barrel 48 cling to the resin layer 32 at the portion thereof within the effective diameter of light rays.

The groove 32b formed in the resin layer 32 traps the shavings from the lens barrel 48 so that these shavings are prevented from attaching themselves to the resin layer 32 at the portion thereof within the effective diameter of light rays. Since contaminants other than the shavings, such as dust, also accumulate on the inner peripheral surface of the lens barrel 48, these contaminants also can be prevented from attaching themselves to the resin layer 32 at the portion thereof within the effective diameter of light rays.

Third Embodiment

Figure 13:
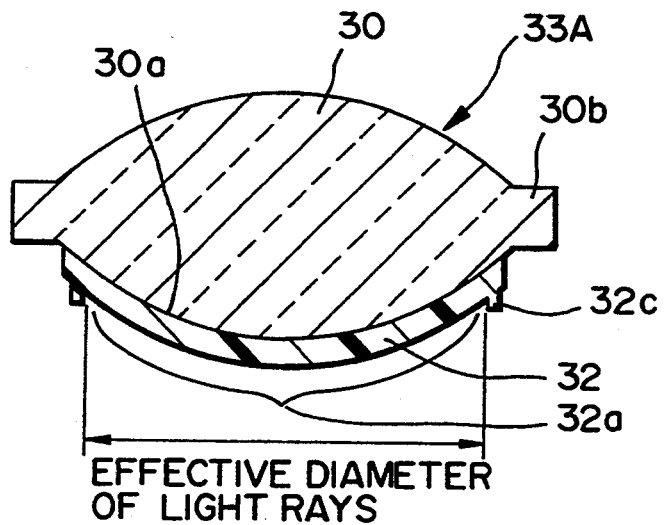
FIG. 13 is a diagram showing a lens element according to a third embodiment of the invention.

FIG. 13 is a diagram showing the shape of a lens element 33A according to a third embodiment of the present invention. In the second embodiment described above, the annular groove 32b is formed in the resin layer 32 as the second functional portion. The lens element 33A of the third embodiment is formed to have a projection 32c instead of the groove 32b. In accordance with this arrangement, the projection 32c serves as a wall. Therefore, in a manner exactly the same as that described in the second embodiment, shavings from the inner peripheral surface of the lens barrel 48 and dust can be prevented from adhering to the resin layer 32 at the portion thereof within the effective diameter of light rays.

Thus, in accordance with the lens element of the second and third embodiments, the outer peripheral portion of the resin layer performs a dust preventing function. This makes it possible to prevent contaminants such as shavings from attaching themselves to the lens element.

Fourth Embodiment

Figure 14:
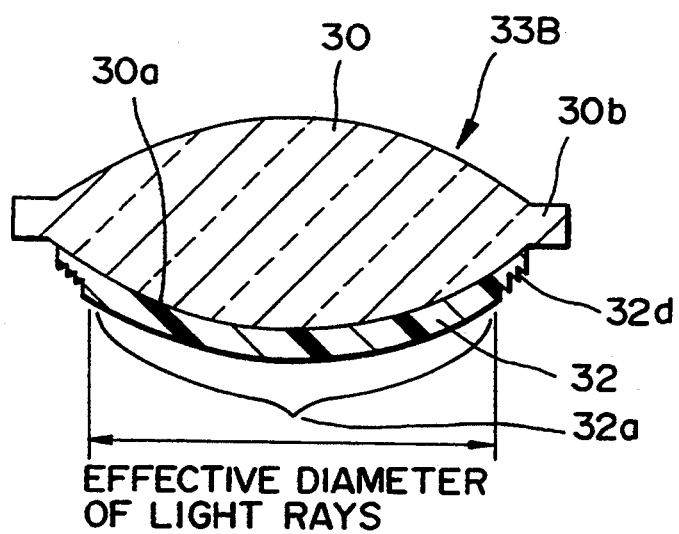
FIG. 14 is a diagram showing a lens element according to a fourth embodiment of the invention.

FIG. 14 is a diagram showing the shape of a lens member 33B according to a fourth embodiment of the invention. The lens element 33B of this embodiment is formed to have a light-shielding portion 32d (a second functional portion), of the kind shown, on the outer periphery of the aspherical portion 32a of the resin layer 32. By thus providing the light-shielding portion 32d on the outer periphery of the resin layer 32, light reflected by the inner peripheral surface of the lens barrel 48 can be prevented from impinging upon the lens element 33 and a group of lenses behind it. As a consequence, it is possible for the function of the light-shielding portion formed on the inner surface of the lens barrel 48 to be brought instead to the lens element, thereby dispensing with the need for the light-shielding portion on the inner surface of the lens barrel 48. Accordingly, the lens barrel 48 can be reduced in cost.

Thus, in accordance with the lens element of the fourth embodiment, it is possible to endow the lens element with the function possessed by the lens barrel in the prior art, thereby enabling a low-cost lens barrel to be produced.

In the second through fourth embodiments set forth above, a case is described in which a lens element having a convex surface is molded. However, it is possible to mold a lens element having a concave surface in exactly the same way.

Fifth Embodiment

Figure 15:
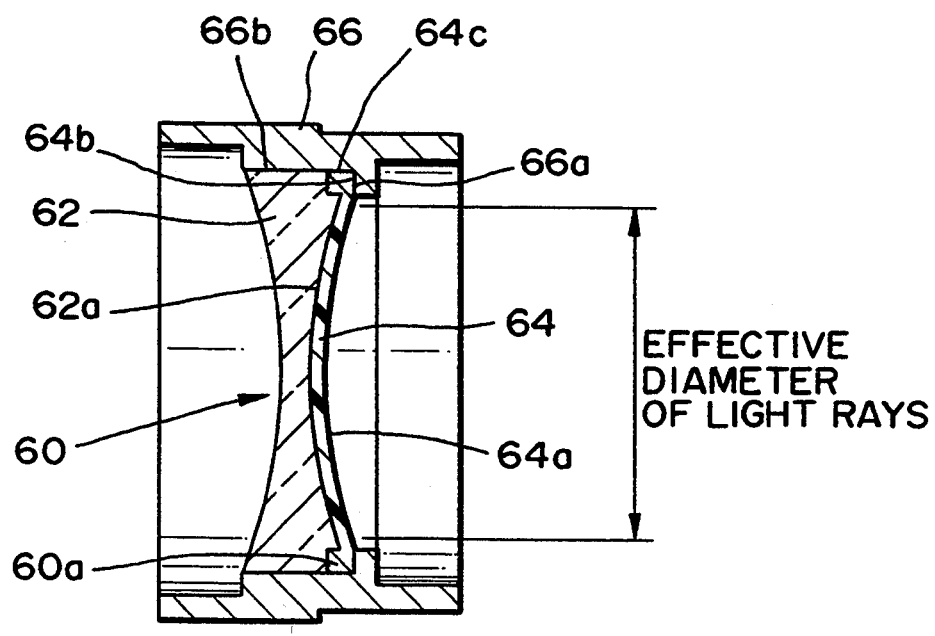
FIG. 15 is a diagram showing the lens element of a fifth embodiment in a state incorporated in the lens barrel.

A lens element according to a fifth embodiment of the invention will now be described. The lens element of the fifth embodiment is characterized in that the resin layer is extended up to the outer circumferential portion of the glass member and the rim portion is formed from the resin. In FIG. 15, a lens element 60 according to this embodiment has an aspherically shaped resin layer 64, which comprises a resin curable by ultraviolet radiation, formed on a contact surface 62a constituting the surface of a glass member 62, which has a concave surface. This lens is one type of replica lens of the kind described earlier. A planar portion 64b which perpendicularly intersects the optic axis of the lens element 60 is formed on the extended part of the resin layer 64 outwardly of the optical portion of the resin layer (namely the portion of the resin layer within the effective diameter light rays). By bringing the planar portion 64b into abutting contact with a positioning portion 66a of a lens barrel 66, the lens element 60 can be positioned with respect to the lens barrel 66. The resin layer 64 has an outer circumferential surface 64c molded so that the resin layer will have an outer diameter that allows the outer circumferential surface 64c to be fitted into the inner circumferential surface 66b of the lens barrel 66. The arrangement is such that the optical axis of the lens element 60 can be made aligned with the optical axis of the lens barrel 66 when the lens element 60 has been mounted in the lens barrel 66. The planar portion 64b and the outer circumferential surface 64c form a rim portion 60a of the lens element.

Since the rim portion 60a is formed as an integral part of the resin layer 64 in the manner described above, it can be formed at the same time as the aspherical resin layer 64 when this layer is molded on the contact surface 62a of the glass member 62. As a result, the surface 64a of the optical portion of resin layer 64, the planar portion 64b for positioning the lens element 60 with respect to the lens barrel 66, and the outer circumferential surface 64c of the resin layer are formed by a single continuous molding surface of the mold member. Accordingly, the surface 64a of the optical portion, the planar portion 64b and the outer circumferential surface 64c are molded to have a highly precise positional relationship. When the lens element 60 has been incorporated in the lens barrel 66, the position of the resin layer 64 in the direction of the optical axis and its position in the direction perpendicular to the optical axis are set accurately with respect to the lens barrel 66.

Further, since the rim portion 60a formed on the glass member 62 in the prior art is instead formed on the resin layer 64 in this embodiment, the rim portion 60a is formed with ease and at the same time as the optical portion of the resin layer 64. As a result, the troublesome work involved in forming the rim portion on the glass member 62 can be eliminated. This contributes to a reduction in the cost of the lens element 60.

Sixth Embodiment

Figure 16:
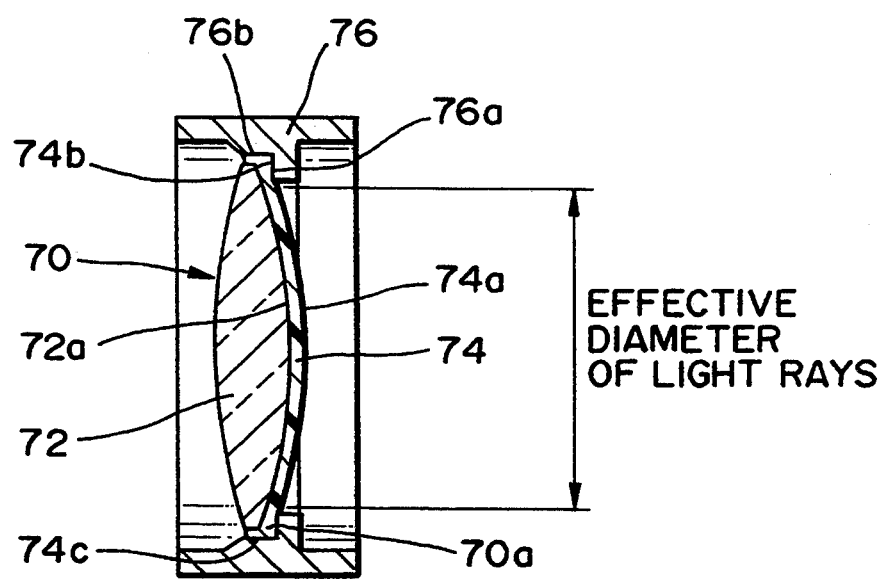
FIG. 16 is a diagram showing the lens element of a sixth embodiment in a state incorporated in the lens barrel.

FIG. 16 illustrates a sixth embodiment of the present invention. Here a lens element having a convex surface is shown incorporated in a lens barrel.

In FIG. 16, a resin layer 74 and a rim portion 70a of a lens element 70 are formed integral with a contact surface 72a of a glass member 72, which has a convex surface, in the same manner as in the lens element 60 of the fifth embodiment. Accordingly, the lens element 70 having the convex surface exhibits the same effects as those of the fifth embodiment. When the lens element 70 has been incorporated in the lens barrel 76, the position of the resin layer 74 in the direction of the optic axis and its position in the direction perpendicular to the optic axis can be set accurately with respect to the lens barrel 76. In addition, since it is unnecessary to form the rim portion 70a on the glass member 72, the lens element 70 can be reduced in cost.

Thus, in accordance with the lens element of the fifth and sixth embodiments, the rim portion is formed on the extended portion of the resin layer, thereby making it possible to eliminate the labor involved in precisely forming a rim portion on the glass member. This makes it possible to reduce the cost of the lens element.

Seventh Embodiment

Figure 17:
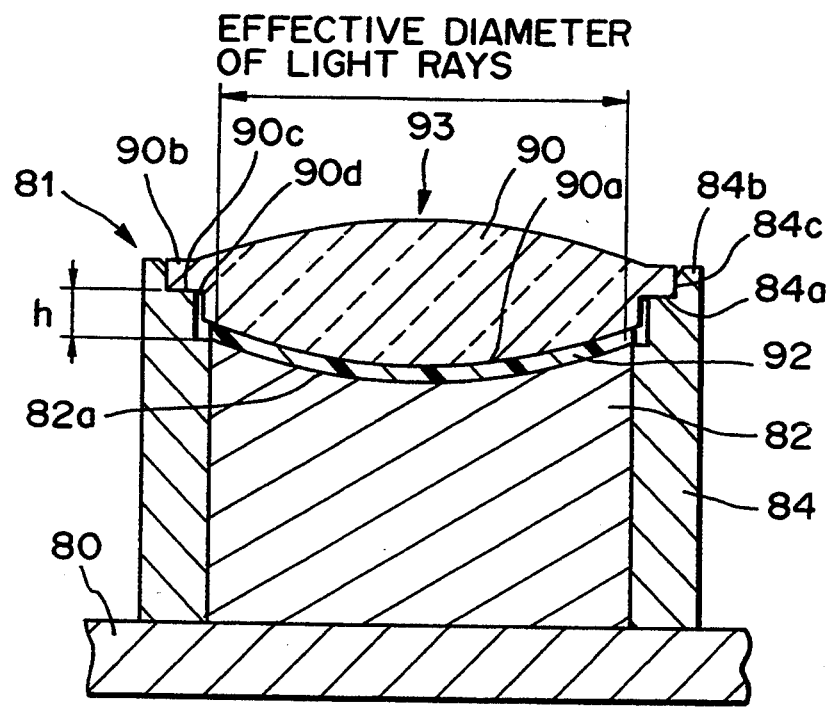
FIG. 17 is a diagram showing a lens element according to a seventh embodiment as well as the structure of a mold for molding this lens element.

FIG. 17 illustrates a lens element and the structure of a mold member for molding this lens element according to the seventh embodiment of the invention.

In FIG. 17, a lens element 93 is obtained by forming an aspherical resin layer 92 on a contact surface 90a of a glass member 90 having a convex surface. The resulting lens is referred to as a replica lens. Before the lens element 93 is described, a mold 81 for forming the resin layer 92 on the surface of the glass member 90 will discussed.

The mold 81 is placed upon a supporting base plate 80, which is supported in a horizontally extending state on the main body of an apparatus (not shown) for manufacturing the lens element 93. More specifically, a generally columnar mold member 82 which forms the principal part of the mold 81 is placed upon the supporting base plate 80 in such a manner that the central axis of the mold member 82 is made to agree with a vertical line. The upper end face of the mold member 82 is formed to have a molding surface 82a for transferring a predetermined aspherical shape to the surface of the resin layer 92. A generally cylindrical support member 84 having an inner peripheral surface into which the outer peripheral surface of the mold member 82 is fitted is placed on the outer side of the mold member 82. The upper portion of the support member 84 is formed to have a supporting surface 84a for supporting the glass member 90 in such a manner that its contact surface 90a is spaced away from the molding surface 82a of the mold member 82 by a distance which defines the thickness of the resin layer 92.

The supporting surface 84a projects by an amount h from the edge of the molding surface 82a of mold member 82, as shown in FIG. 17. The amount of projection h determines the thickness of the resin layer 92. Though the value of h differs depending upon the ratio to which the molding surface 82a is aspherical, it is set in such a manner that the thickness of the resin layer 92 will not be less than a prescribed thickness (e.g., about 30 μm) even at portions where the resin layer is thinnest.

The outer circumferential portion of the supporting surface 84a at the upper end of the support member 84 is formed to have a cylindrical positioning portion 84b which protrudes upwardly from the supporting surface 84a. The inner circumferential surface 84c of the positioning portion 84b has an inner diameter which allows the outer circumferential surface of the rim portion 90b of the glass member 90, described below, to be fitted into the positioning portion 84b. By fitting the outer circumferential surface of the rim portion 90b of glass member 90 into the inner circumferential surface 84c, the optical axis of the glass member 90 can be made to accurately coincide with the center of the molding surface 82a.

The glass member 90 has an optical portion (the part of the glass member inside the effective diameter of light rays) at its central part. The upper and lower surface of the optical portion are worked to a spherical shape. The resin layer 92 is formed on the contact surface 90a, which is the surface on the lower side of the optical portion. The glass member 90 has the flange-shaped rim portion 90b on its outer periphery. The rim portion 90b is formed to have a height-determining surface 90c which, by being abutted against the supporting surface 84a of the support member 84, determines the vertical position of the glass member 90 with respect to the mold member 82. The outer circumferential surface 90d of the rim portion 90b is worked to have an outer diameter for allowing it to mate with the inner circumferential surface 84c of the positioning portion 84b of support member 84, as set forth above. The height-determining surface 90c and the outer circumferential surface 90d are used also as positioning portions when the lens element 93 is incorporated in the lens barrel.

The height-determining surface 90c of the rim portion 90b is cut away in such a direction that the thickness of the glass member 90 is reduced with respect to a surface extension of the contact surface 90a. The portion of the glass member 90 situated between the rim portion 90b and the optical portion of the glass member 90 is worked to have the same thickness as the rim portion 90b, thereby forming a low-rigidity portion 90d. By thus forming the low-rigidity portion 90d between the rim portion 90b and the optical portion, it is possible to reduce the rigidity with which the glass member 90 is supported when the height-determining surface 90c of the rim portion 90b is supported. As a result, it is possible for the optical portion of the glass member 90 to undergo a very small amount of displacement, with respect to the rim portion 90b, along the optical axis.

The reason for enabling the optical portion of the glass member 90 to undergo a very small amount of displacement in this manner will now be described.

When the resin layer 92 is formed on the contact surface 90a of the glass member 90, the resin material, which initially is in the liquid state, is charged in the space defined by the contact surface 90a and the molding surface 82a, and the amount of resin material thus introduced is cured. When the resin material cures, it undergoes contraction and there are instances where peeling develops between the contact surface 90a and the resin layer 92 and between the molding surface 82a and the resin layer 92. When such a peeling phenomenon occurs, the lens element 93 formed is of unacceptable quality.

The peeling phenomenon can be prevented by displacing the optical portion of the glass member 90 a slight amount along the optical axis in such a manner that it will follow up the contraction of the resin layer 92 when contraction occurs at curing of the resin layer. More specifically, the low-rigidity portion 90d is formed for the purpose of allowing the glass member 90 to flex in response to contraction of the resin layer 92 so that the optical portion of the glass member may readily undergo displacement along the optical axis.

Described next will be the procedure for forming and working the lens element 93.

First, with reference to FIG. 17, the resin material is supplied onto the molding surface 82a of the mold member 82 with the glass member 90 detached from the support member 84. The resin material supplied is of the type cured by activating energy. For example, a resin of the type cured by ultraviolet radiation (a resin constituted by a monomer of urethanated acrylate and acrylate) is known as being such a resin material suitable for molding the lens element 93.

The glass member 90 is placed upon the support member 84 with its rim portion 90b inserted inside the positioning portion 84b of the support member 84. With the glass member 90 thus placed upon the support member 84, the height-determining surface 90c of the glass member 90 is abutted against the supporting surface 84a of the support member 84 and the outer circumferential surface of the rim portion 90b is fitted into the inner circumferential surface 84c of the positioning member 84b. Accordingly, the glass member 90 is positioned accurately with respect to the mold member 82 in a direction along the optical axis and a direction perpendicularly intersecting the optical axis.

When the glass member 90 is placed upon the support member 84, the contact surface 90a of the glass member 90 urges the resin material broadly across the entire surface of the molding surface 82a. This operation of placing the glass member 90 upon the support member 84 is carried out very carefully so that air bubbles will not be entrapped in the resin material.

When this step of placing the glass member 90 upon the support member 84 ends, the resin material is irradiated with activating energy to cure the resin material, thereby forming the resin layer 92. In the case where the resin used is of the type cured by ultraviolet rays, it goes without saying that ultraviolet rays are used as the activating energy rays.

Due to the fact that the low-rigidity portion 90d has been formed between the rim portion 90b and the optical portion of the glass member 90, the optical portion of the glass member 90 is displaced slightly along the optic axis while following up the contraction of the resin material when the resin material cures. As a result, peeling can be prevented between the glass member 90 and the resin layer 92 and between the mold member 82 and the resin layer 92. The flexure of the glass member 90 means that the shape of the surface of resin layer 92 will deviate slightly from the shape of the molding surface 82a of mold member 82 when the lens element 93 whose molding has been completed is separated from the mold. However, since the amount of this deviation is very small, the optical performance of the lens element 93 is not significantly affected; the occurrence of the above-mentioned peeling phenomenon would lead to a far greater problem. The fact that the peeling phenomenon can be prevented means that outstanding effects can be obtained.

After the resin layer 92 has cured completely, the lens element 93 is released from the mold 81, thereby providing the completed lens element 93.

Figure 18:
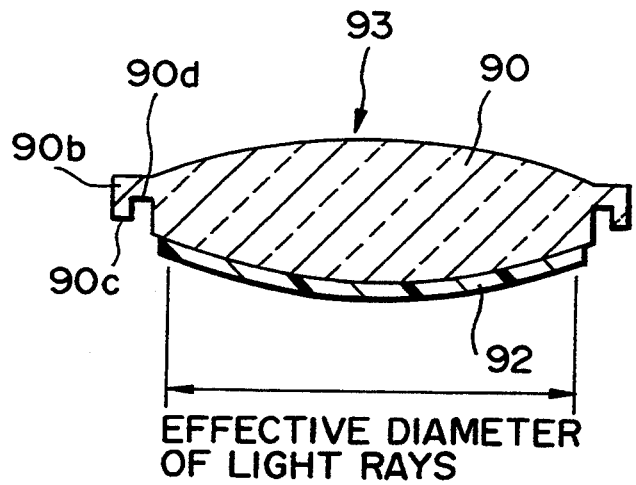
FIG. 18 is a diagram showing a modification of the lens element according to the seventh embodiment.

In the foregoing embodiment, the low-rigidity portion, which has the same thickness as the rim portion, is formed between the rim portion and the optical portion. However, as shown in FIG. 18, a low-rigidity portion 90d having a shape different from that of the rim portion 90b may be provided between the rim portion 90b and the optical portion.

Eighth Embodiment

Figure 19:
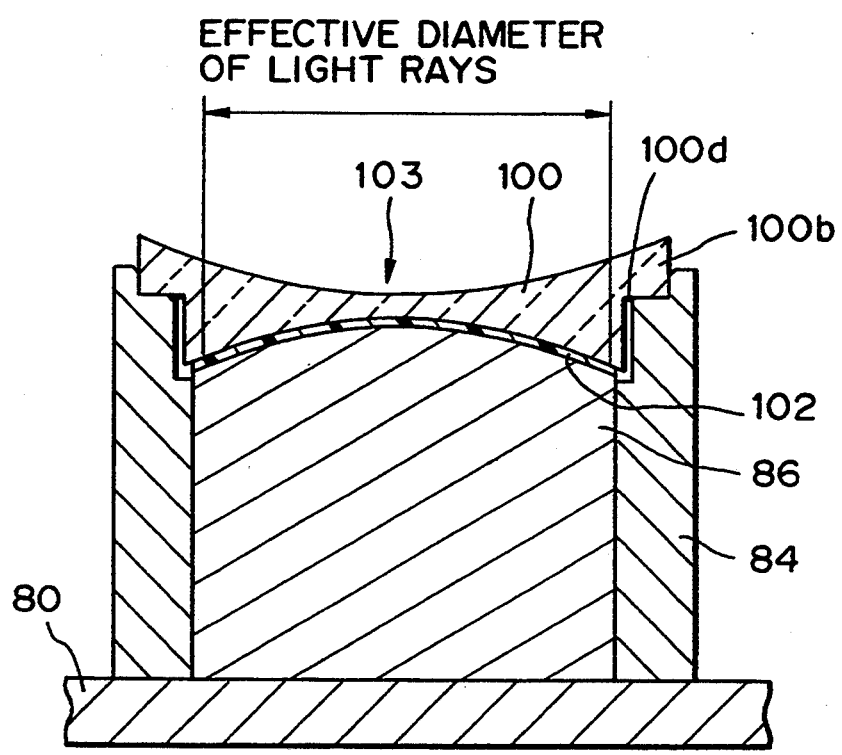
FIG. 19 is a diagram showing a lens element according to an eighth embodiment as well as the structure of a mold for molding this lens element.

FIG. 19 illustrates a lens element and the structure of a mold for molding the lens element.

The lens element of the eighth embodiment is obtained by forming a resin layer on the surface of a glass member having a convex surface. The embodiment of FIG. 19 is exactly the same as the seventh embodiment except that the glass member is concave and use is made of a mold member which corresponds to this glass member.

In FIG. 19, the outer circumferential surface of a glass member 100 is formed to have a flange-shaped rim portion 100b, just as in the above embodiment. A low-rigidity portion 100b is formed between the rim portion 100b and the optical portion (the part of the glass member inside the effective diameter of light rays). As a result, the optical portion of the glass member 100 is capable of undergoing a very small amount of displacement along the optical axis when a resin layer 102 is cured. This makes it possible to prevent peeling of the resin layer in exactly the same way as the seventh embodiment.

Thus, in accordance with the lens element of seventh and eighth embodiments described above, the low-rigidity portion is provided between the rim portion and the optical portion of the glass member, thereby enabling the optical portion of the glass member to follow up contraction of the resin layer at the curing thereof and undergo a very small amount of displacement along the optic axis. This makes it possible to prevent peeling between the glass member and the resin layer and between the mold member and the resin layer. Furthermore, owing to the action of the low-rigidity portion, the optical portion of the glass member can be make to readily undergo displacement even if the outer diameter of the glass member is not made large. As a result, an enlargement in the size of the lens element can be prevented.

It should be noted that the present invention can be modified in various ways with departing from the scope of the claims. For example, though a case has been described in which a resin curable by ultraviolet rays is used as the resin curable by activating energy, the resin used can be of the type cured by X rays or infrared rays. Further, though a case has been described in which an aspherical shape is formed on the surface of the resin layer, an arrangement may be adopted in which a spherical shape is formed.

The present invention is not limited to the above embodiments and various changes and modifications can be made within the spirit and scope of the present invention. Therefore, to apprise the public of the scope of the present invention, the following claims are made.

What is claimed is:

1. A lens element in which a resin material is integally molded on a glass member, wherein a flow relief portion for impeding adhesion of the resin material to an outer circumferential portion of said glass member is provided between the outer circumferential portion and an optical surface of said glass member, and wherein said flow relief portion is shaped so as to impede resin adhesion in a direction in which said glass member is cut away with respect to an extension of the surface of said glass member.

* * * * *

UNITED STATES PATENT AND TRADEMARK OFFICE
CERTIFICATE OF CORRECTION

PATENT NO. : 5,361,168
DATED : November 1, 1994
INVENTOR(S) : TAKASHI ARAI, ET AL.

It is certified that error appears in the above-indentified patent and that said Letters Patent is hereby corrected as shown below:

COLUMN 2:

Line 37, "shaped" should read --shape--.

COLUMN 4:

Line 3, "optic" should read --optical--.

COLUMN 5:

Line 11, "drawings," should read --drawings.--.

Line 30, "men%her" should read --member--.

Line 40, "in" should read --is--.

COLUMN 8:

Line 49, "FIG. 3(b))." should read --FIG. 3(b).--.

COLUMN 9:

Line 35, "and" should read --will--.

UNITED STATES PATENT AND TRADEMARK OFFICE
CERTIFICATE OF CORRECTION

PATENT NO. : 5,361,168  
DATED : November 1, 1994  
INVENTOR(S) : TAKASHI ARAI, ET AL.

Page 2 of 3

It is certified that error appears in the above-indentified patent and that said Letters Patent is hereby corrected as shown below:

COLUMN 10:

Line 37, "the" (last occurrence) should be deleted.

COLUMN 11:

Line 5, "layer" should read --layer is--.

Line 36, "is is" should read --is--.

COLUMN 12:

Line 48, "rays" should read --ray--.

COLUMN 14:

Line 9, "with" should read --which--.

UNITED STATES PATENT AND TRADEMARK OFFICE
CERTIFICATE OF CORRECTION

PATENT NO. : 5,361,168
DATED : November 1, 1994
INVENTOR(S) : TAKASHI ARAI, ET AL.

It is certified that error appears in the above-indentified patent and that said Letters Patent is hereby corrected as shown below:

<u>COLUMN 16:</u>

Line 48, "optic" should read --optical--.

Line 49, "optic" should read --optical--.

Signed and Sealed this

Sixth Day of June, 1995

Attest:

BRUCE LEHMAN

Attesting Officer

Commissioner of Patents and Trademarks